United States Patent
Bortoli

(10) Patent No.: US 9,726,149 B2
(45) Date of Patent: Aug. 8, 2017

(54) SPIRAL BEVEL GEAR SET FOR RAM AIR TURBINE

(75) Inventor: Stephen Michael Bortoli, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1575 days.

(21) Appl. No.: 13/008,203

(22) Filed: Jan. 18, 2011

(65) Prior Publication Data

US 2012/0183402 A1 Jul. 19, 2012

(51) Int. Cl.

| | |
|---|---|
| B64D 41/00 | (2006.01) |
| F03D 9/00 | (2016.01) |
| F16H 1/14 | (2006.01) |
| F03D 15/00 | (2016.01) |
| F16H 55/08 | (2006.01) |

(52) U.S. Cl.
CPC ............. *F03D 9/00* (2013.01); *B64D 41/007* (2013.01); *F03D 15/00* (2016.05); *F16H 1/14* (2013.01); *F05B 2220/50* (2013.01); *F05B 2240/50* (2013.01); *F05B 2240/923* (2013.01); *F05B 2260/503* (2013.01); *F05B 2260/5032* (2013.01); *F05D 2260/4031* (2013.01); *F16H 55/0846* (2013.01); *Y02E 10/722* (2013.01); *Y10T 29/49229* (2015.01); *Y10T 74/19665* (2015.01)

(58) Field of Classification Search
CPC ......... F03D 9/00; F03D 15/00; B64D 41/007; F16H 1/14
USPC ............... 29/889.2, 893.1, 893.2; 415/124.1; 416/142, 170 R; 475/336
See application file for complete search history.

(56) References Cited

U.S. PATENT DOCUMENTS

| | | | | |
|---|---|---|---|---|
| 3,339,639 | A | * | 9/1967 | Elmes et al. ..................... 416/48 |
| 3,633,411 | A | * | 1/1972 | Bass et al. ................. 73/112.01 |
| 3,635,584 | A | | 1/1972 | Chilman et al. |
| 3,774,466 | A | | 11/1973 | Bhatia et al. |
| 3,942,387 | A | * | 3/1976 | Stone et al. ..................... 74/417 |
| 4,717,095 | A | | 1/1988 | Cohen et al. |
| 4,742,976 | A | | 5/1988 | Cohen |

(Continued)

FOREIGN PATENT DOCUMENTS

| | | |
|---|---|---|
| CN | 200985980 | 12/2007 |
| CN | 201687895 | 12/2010 |

OTHER PUBLICATIONS

U.S. Appl. No. 12/949,178, Ram Air Turbine Bearing Spacer, filed Nov. 18, 2010.

*Primary Examiner* — Craig Kim
*Assistant Examiner* — Danielle M Christensen
(74) *Attorney, Agent, or Firm* — Carlson, Gaskey & Olds, P.C.

(57) ABSTRACT

A ram air turbine (RAT) assembly includes a gearbox that supports a gear set with a ring gear that drives a pinion gear. The gear set provides for the transmission of power from the turbine to a generator, pump or other power conversion device. A turbine shaft supports the ring gear and a pinion shaft that rotates about an axis transverse to the turbine shaft supports the pinion gear. A ratio between a face width and a diametrical pitch of the gear set is within a desired ratio that provides sufficient space for supporting bearing assemblies while providing for operation within the physical constraints and desired performance requirements of the RAT.

14 Claims, 4 Drawing Sheets

(56) References Cited

U.S. PATENT DOCUMENTS

| | | | |
|---|---|---|---|
| 4,991,796 A * | 2/1991 | Peters et al. | 244/58 |
| 5,174,719 A | 12/1992 | Walsh et al. | |
| 6,580,179 B2 | 6/2003 | Eccles et al. | |
| 6,676,379 B2 | 1/2004 | Eccles et al. | |
| 7,137,785 B2 | 11/2006 | Van Egeren et al. | |
| 7,210,375 B2 * | 5/2007 | Korner | 74/606 R |
| 7,708,527 B2 | 5/2010 | Eccles et al. | |
| 2010/0000358 A1 | 1/2010 | Paluncic et al. | |

* cited by examiner

US 9,726,149 B2

SPIRAL BEVEL GEAR SET FOR RAM AIR TURBINE

BACKGROUND

This disclosure generally relates to a ram air turbine assembly. More particularly, this disclosure relates to a gear box of a ram air turbine assembly for transferring torque from a turbine to a generator or pump.

A ram air turbine (RAT) is deployable to generate power when sufficient primary power generation is not available. A RAT includes a turbine that is deployed into an airstream along the aircraft. Rotation of the turbine drives a generator or hydraulic pump. The generator or pump can be mounted at a pivot point of the RAT that is a distance from the turbine deployed within the airstream. Accordingly, a drive arrangement including a gearbox is utilized to transfer power from the turbine to the generator or pump. The drive arrangement includes a gearbox that provides a desired speed and direction for driving the generator or pump. Gears, shafts and other drive components are constrained by limitations in the desired size, weight, and power generation of the RAT.

SUMMARY

A disclosed example of a ram air turbine (RAT) assembly includes a gearbox that supports a gear set with a ring gear that drives a pinion gear. The gearbox provides for the transmission of power from the turbine to a generator, pump or other power conversion device. A turbine shaft supports the ring gear and a pinion shaft that rotates about an axis transverse to the turbine shaft is driven by the pinion gear. A forward bearing and a rear bearing are disposed on opposite sides of the pinion gear to support rotation. The forward bearing is disposed within a distance between a pinion gear crown and a pitch apex of the gear set. Further, a disclosed example embodiment includes a face width of the gear set that is related to the diametrical pitch according to a desired ratio.

These and other features disclosed herein can be best understood from the following specification and drawings, the following of which is a brief description.

DETAILED DESCRIPTION

Figure 1:
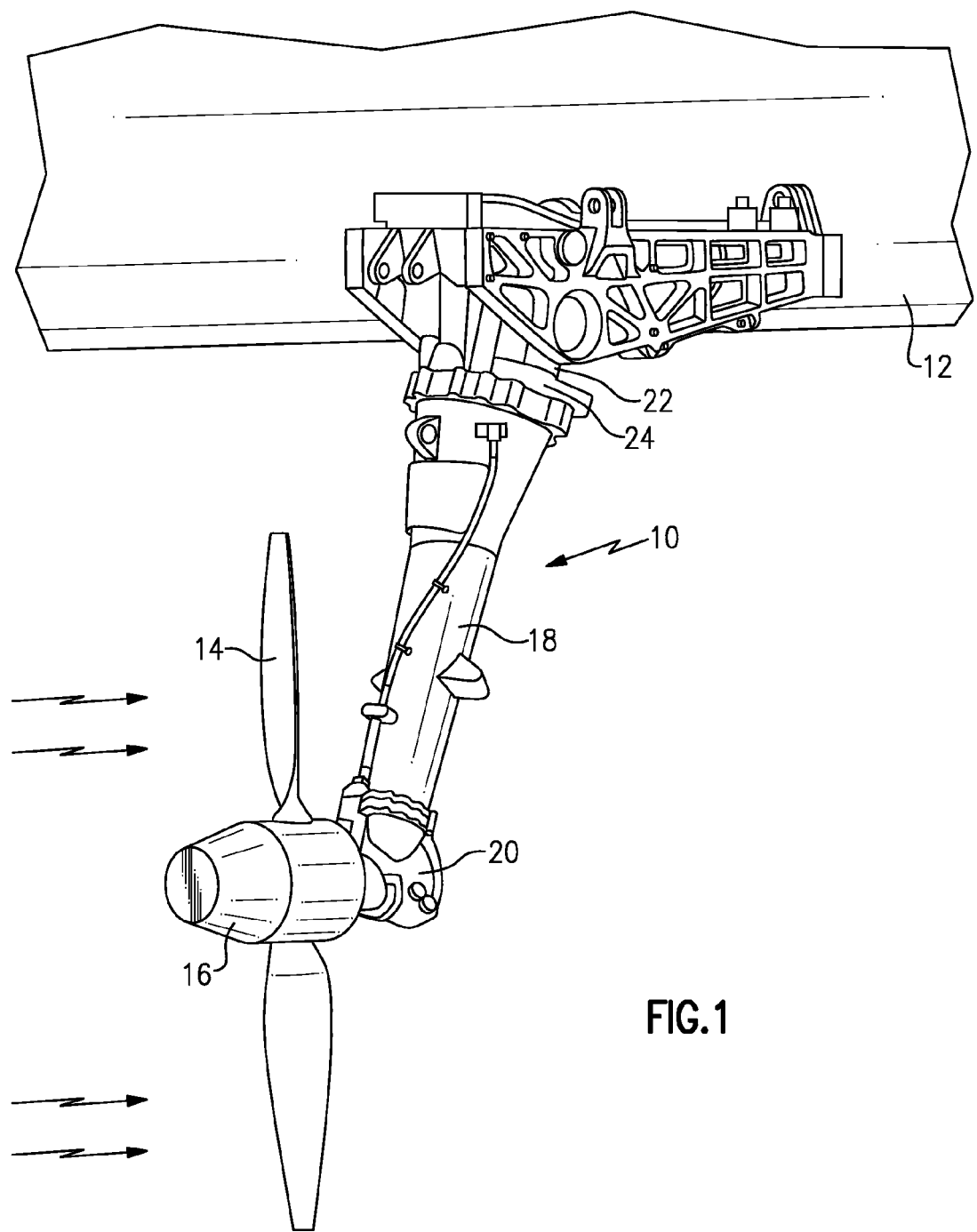
FIG. 1 is a schematic view of an example ram air turbine assembly.

Referring to FIG. 1, a ram air turbine (RAT) assembly 10 is generally indicated and is movable between a stowed position within an aircraft 12 and a deployed position as is shown. The RAT 10 includes a turbine 16 with blades 14 that rotate responsive to airflow. The turbine 16 is suspended on a strut 18 that moves between the deployed and stowed positions. The strut 18 supports a gearbox 20 that transmits power from the turbine 16 to a generator 22 within a generator housing 24. The strut 18 is attached to the generator housing 24 within which the generator 22 is supported. As appreciated, the example ram air turbine assembly 10 includes a generator 22; however, the RAT 10 could also be utilized to drive a hydraulic pump or other power generator or conversion device.

Figure 2:
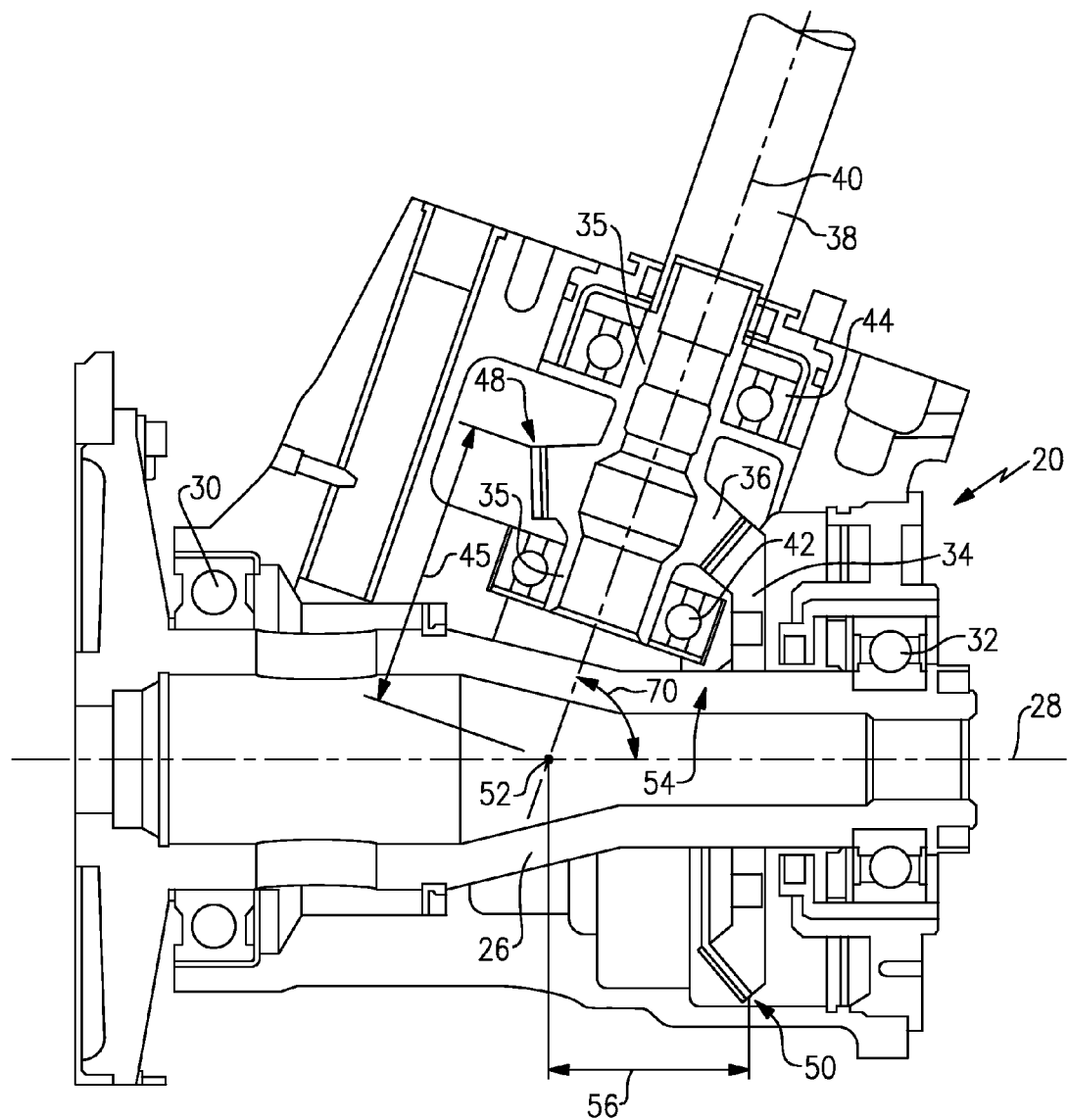
FIG. 2 is a cross sectional view of an example gearbox for the ram air turbine assembly.

Referring to FIG. 2, the gearbox 20 supports a gear set 54 (Best shown in FIGS. 3 and 4) that includes a pinion gear 36 and a ring gear 34. The gearbox 20 includes a turbine shaft 26 that rotates about a first axis 28 and is supported by bearing assemblies 30 and 32. The turbine shaft 26 supports the ring gear 34 that is engaged to the pinion gear 36. The pinion gear 36 is supported within the gearbox 20 for driving a pinion shaft 38 about an axis 40 transverse to the turbine shaft 26. The pinion gear 36 is supported by a forward bearing assembly 42 and a rear bearing assembly 44. The pinion shaft 38 is engaged to the pinion gear 36 and extends through the strut 18 to the generator 22. In this example, the pinion gear 34 includes integral shaft portions 35 that provide for mounting and rotation about the axis 40. It is within the contemplation of this invention that the pinion gear 34 could be mounted to a separate shaft.

The ring gear 34 and the pinion gear 36 are spiral beveled gears that mesh to provide the desired transmission of power from the turbine shaft 26 to the pinion shaft 38 and finally to the example generator 22. The number of teeth on each of the ring gear 34 and the pinion gear 36 are determined to provide the desired speed of the pinion shaft 38 responsive to the input of the turbine shaft 26 to drive the generator 22.

Engagement between the ring gear 34 and the pinion gear 36 transfers torque from the turbine 16 to the generator 22 located at the pivot point of the RAT 10. The meshing engagement between the ring gear 34 and the pinion gear 36 is configured to withstand varying torque loads produced during operation.

During operation transferred torque will vary and result in a condition known as torque ripple. Torque ripple is a function of the structural natural frequencies of the RAT 10 driveline from the turbine 16 through to the generator 22. The example gear set 54 includes features that accommodate expected torque ripple and any extra loading. Furthermore, variations in part fabrication and assembly can result in some relative movement between the ring gear 34 and the pinion gear 36. Moreover, variations in operating loads and temperatures coupled with necessary component clearances can also result in relative movements. Such movements and variations are accommodated in the design of the mating ring gear 34 and pinion gear 36.

The forward bearing 42 and the rear bearing 44 are disposed on opposite sides of the pinion gear 36 to support rotation about the axis 40. The forward bearing 42 is disposed within a distance 46 between a pinion gear crown 48 and the pitch apex 52 of the gear set 54. Further the forward bearing 42 is disposed within the distance 56 between ring gear crown 50 and the pitch apex 52. The pitch apex 52 of the gear set 54 is that point where the turbine shaft axis 28 and the pinion shaft axis 40 intersect.

Referring to FIGS. 3, 4, 5A, 5B, 6A and 6B, with continued reference to FIG. 2, the ring gear 34 and the pinion gear 36 each include a common face width 60. The face width 60 is a length along the pitch cone of the gear teeth of each of the pinion gear 36 and the ring gear 34. Diametrical pitch is a ratio between the number of teeth on the gears and a pitch diameter for each of gears 34, 36. In the disclosed example the pinion gear pitch diameter is indicated at 76 (FIG. 5) and the pitch diameter for the ring gear 34 is indicated at 78 (FIG. 6).

In one example embodiment, a ratio between the number of gear teeth 82 of the ring gear 34 is related to the number of gear teeth 80 on the pinion gear 36 is approximately 2. In one example dimensional embodiment, the pinion gear 36 includes twenty-three teeth 80 and the ring gear 34 includes fifty teeth 82.

In this example embodiment the face width 60 of both the pinion gear 36 and the ring gear 34 is related to the diametrical pitch according to a ratio within a range between 11.48-11.85. This ratio provides the desired meshing engagement between the corresponding gear teeth 80, 82 while still providing the clearance for the forward bearing assembly 42. As appreciated, the specific gear ratio is determined according to application specific requirements given the input of the turbine, the output requirements and the power requirements for driving the generator, pump or other power generating device.

Figure 3:
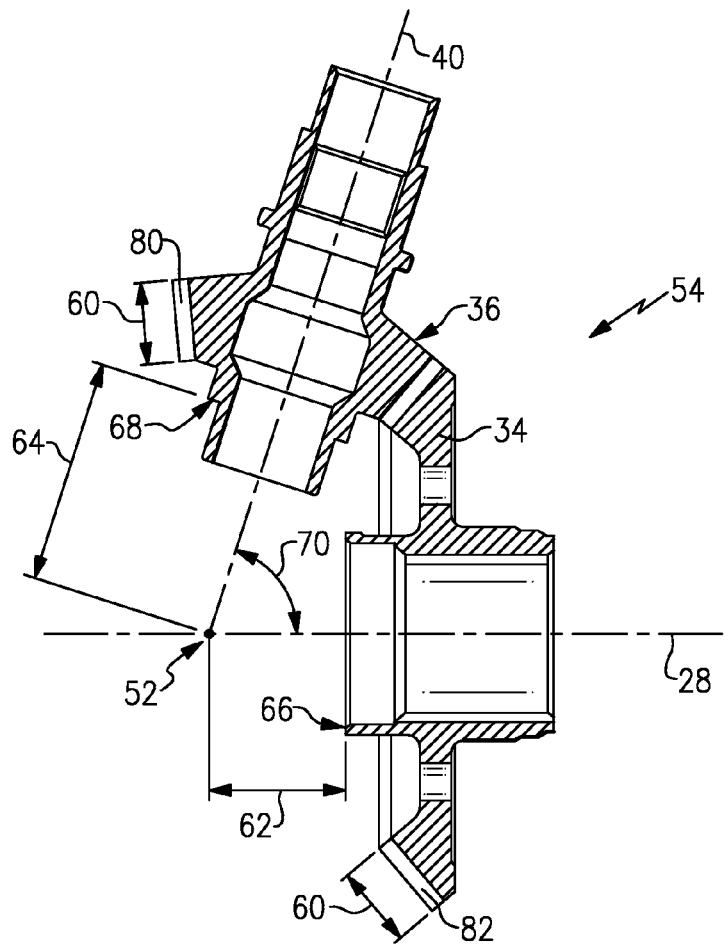
FIG. 3 is a schematic representation of an example gear set for the ram air turbine assembly.
Figure 4:
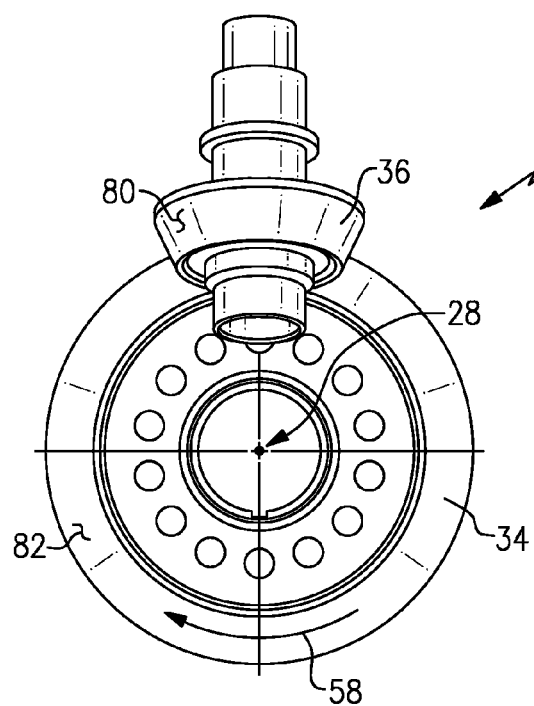
FIG. 4 is another view of the example gear set for the ram air turbine assembly.
Figure 5A:
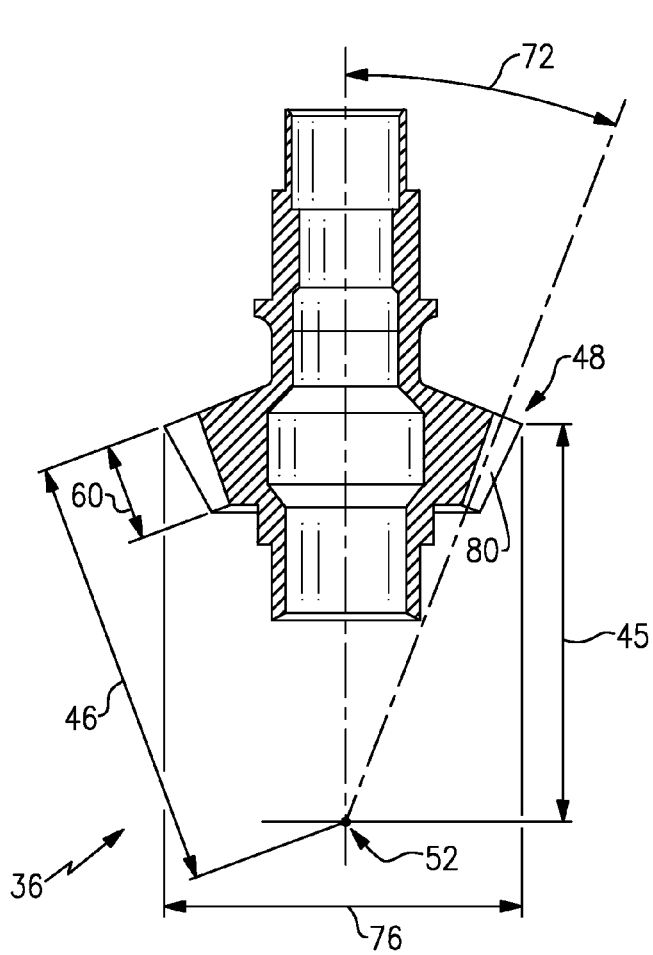
FIG. 5A is a cross sectional of an example pinion gear of the example gear set for the ram air turbine assembly.
Figure 5B:
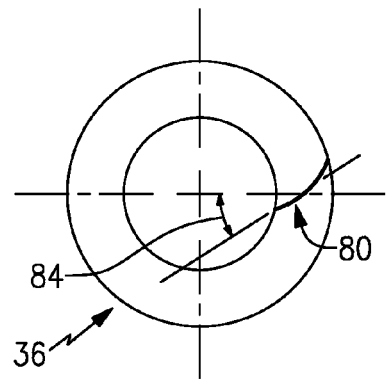
FIG. 5B is a front view of the example pinion gear.
Figure 6A:
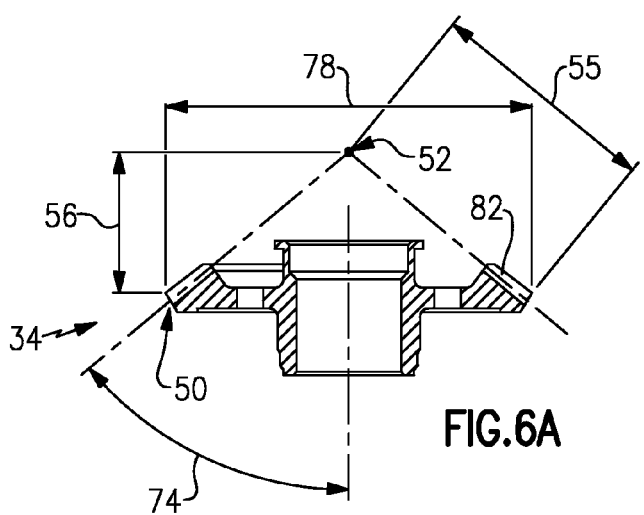
FIG. 6A is a cross sectional view of an example ring gear for the example gear set of the ram air turbine assembly.
Figure 6B:
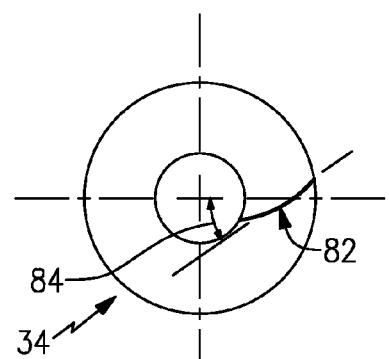
FIG. 6B is a front view of the example ring gear.

Referring to FIGS. 3 and 4 with continued reference to FIG. 2, the pinion gear 36 and the ring gear 34 are shown in relation to each other without the shafts 26 and 38 for clarity purposes. The ring gear 34 rotates about the axis 28 in a direction indicated by arrow 58. Each of the ring gear 34 and the pinion gear 36 are mounted a distance from the apex 52. In this example, a front mounting surface 66 of the ring gear 34 is mounted a distance 62 from the apex 52. A stop surface 68 of the pinion gear 36 is mounted a distance 64 from the apex 52. In this non-limiting embodiment a ratio of the mounting distance 64 to the mounting distance 62 is approximately 1.65. The mounting distance is a function of the required meshing engagement between the teeth of each of the pinion gear and the ring gear.

Moreover, the mounting distance is also a function of the angular relationship between the pinion shaft 38 and the turbine shaft 26. The pinion shaft 38 rotates about the axis 40 at an angle 70 relative to the axis 28 of the turbine shaft 26. In this example, the angle 70 is between 70° and 73°. In another disclosed non limiting dimensional example, the angle 70 is approximately 71 degrees. However, other angles as may be required to conform to application specific requirements are also within the contemplation of this disclosure.

Referring to FIGS. 5A, 5B, 6A, and 6B, a cross section and a front view is shown of each of the pinion gear 36 and the ring gear 34. The gear teeth 80 are set at pitch angle 72 relative to a rotation axis of the pinion gear 36. The gear teeth 82 are set at a pitch angle 74 relative to a rotation axis of the ring gear 34. Each of the pitch angles 72 and 74 extend through the pitch apex 52. Each of the pinion gear 36 and the ring gear 36 include a length parallel to the axis of rotation between a crown of the gear and the pitch apex 52. In this example, the pinion gear 36 includes a length 45 parallel to the axis of rotation between the pitch apex 52 and the crown and the ring gear 34 includes a length 56 parallel to the axis of rotation between the pitch apex 52 and the crown. In one non-limiting example embodiment, a ratio of the length 45 between the pitch apex 52 and the pinion gear crown and the distance 55 between the ring gear crown 50 and the pitch apex 52 is within a range between 1.34 and 1.60.

Each of the pinion gear 36 and the ring gear 34 include a spiral angle 84. The spiral angle 84 is the angle of the corresponding gear teeth 80, 82 relative to the pitch cone. The spiral angle 84 is configured to provide a desired transfer of power and torque. The spiral angle 84 is common to both the pinion gear 36 and the ring gear 34. In this example, the spiral angle 84 is related to the shaft angle 70 (Best shown in FIG. 3) according to a ratio within a range between 0.377 and 0.498. In one non-limiting dimensional embodiment, the example spiral angle 84 is 31° and the example shaft angle 70 is 71.25°.

The gear set 54 is further described according to a ratio between a pitch diameter 76 of the pinion gear 36 and a pitch diameter 78 of the ring gear 34. In one non-limiting embodiment, the pitch diameter 76 of the pinion gear 36 is related to the pitch diameter 78 of the ring gear 34 as a ratio within a range between 0.41 and 0.50. This ratio of the pitch diameters 76, 78 provides the desired configuration to fit within the dimensional constraints of the gearbox 20 while still providing the desired torque transmission and other performance requirements.

Referring back to FIG. 2, with continued reference to FIGS. 3 and 4, a method of installing the gear set 54 within the RAT 10 includes the step of mounting the pinion gear 36 within the gearbox 20 and mounting the ring gear 34 to the turbine shaft 26. The pinion shaft 38 is connected to the pinion gear 36 and the turbine shaft 28 is then mounted within the gearbox 20 such that the pinion gear 36 and the ring gear 34 are in meshing engagement. The pinion gear 36 is supported by the forward bearing assembly 42 that is disposed forward of the pinion gear 36 such that the forward bearing assembly 42 is disposed within the distance 46 between the pitch apex 52 and the pinion gear crown 48. The rear bearing assembly 44 is installed to further support the pinion gear 36 on a side of the pinion gear 36 opposite the forward bearing assembly 42.

The example gear set 54 is configured such that the diametrical pitch is related to the face width 60 of the ring and pinion gears 34, 36 according to a desired ratio. In this example method the diametrical pitch and face width 60 are related according to a ratio within the range between 11.48-11.85. The method of installing the example gear set 54 further includes mounting the pinion gear 36 for rotation about the axis 40 that is disposed at an angle between 70-73° from the axis of rotation 28 of the turbine shaft 26.

The disclosed example gear set 54 for the RAT 10 accommodates torque ripple to provide extending the gear life while also providing necessary margins for other load states. The pinion gear 36 is supported by the forward bearing assembly 42 in a position that is provided by the disclosed example face width 60 and diametrical pitch relationship of the disclosed example gear set 54. The disclosed relationship provides for the desired gear set 54 to operate within the physical constraints and desired performance requirements of the example RAT 10.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A gear set for a ram air turbine, the gear set comprising:
a ring gear supported on a drive shaft driven by a turbine;
a pinion gear driven by the ring gear, the pinion gear driving a pinion shaft, wherein each of the ring gear and the pinion gear include a diametrical pitch and a face width with a ratio between the diametrical pitch and the face width for both the ring gear and the pinion gear being within a range between 11.48 and 11.85 and wherein a ratio of a distance between a pitch apex and pinion gear crown and a distance between the pitch apex and a ring gear crown is within a range between 1.34 and 1.60.

2. The gear set for the ram air turbine as recited in claim 1, wherein each of the ring gear and the pinion gear comprise spiral bevel gears.

3. The gear set for the ram air turbine as recited in claim 2, wherein a spiral angle of gear teeth on each of the ring gear and the pinion gear is related to an angle between the drive shaft and the pinion shaft according to a ratio within a range between 0.377 and 0.498.

4. The gear set for the ram air turbine as recited in claim 1, wherein a ratio of a number of teeth disposed on the ring gear and a number of teeth on the pinion gear is approximately 2.

5. The gear set for the ram air turbine as recited in claim 1, wherein a ratio of a pitch diameter of the pinion gear and a pitch diameter of the ring gear is between 0.41 and 0.50.

6. The gear set for the ram air turbine as recited in claim 1, wherein a ratio between a mounting distance from a front surface of the ring gear and a pitch apex and a mounting distance between a stop surface of the pinion gear is approximately 1.65.

7. The gear set for the ram air turbine as recited in claim 1, including a first bearing assembly for supporting rotation of the pinion gear disposed forward of the pinion gear and a second bearing supporting rotation of the pinion gear disposed rearward of the pinion gear, wherein the first bearing assembly is disposed at least partially within a distance between one of a pinion gear crown and a ring gear crown and a pitch apex of the gear set.

8. A ram air turbine assembly comprising
a turbine driving a drive shaft;
a gearbox supporting the drive shaft and a pinion shaft;
a ring gear supported within the gearbox on the drive shaft; and
a pinion gear supported within the gearbox on the pinion shaft, wherein each of the ring gear and the pinion gear include a diametrical pitch and a face width with a ratio between the diametrical pitch and the face width for both the ring gear and the pinion gear being within a range between 11.48 and 11.85 and wherein a ratio of a length between a pitch apex and a pinion gear crown parallel to an axis of rotation of the pinion gear and a length between the pitch apex and a ring gear crown parallel to an axis of rotation of the ring gear is within a range between 1.34 and 1.60.

9. The ram air turbine assembly as recited in claim 8, wherein the pinion gear and the ring gear comprise spiral bevel gears.

10. The ram air turbine assembly as recited in claim 8, wherein a ratio of a number of teeth disposed on the ring gear and a number of teeth on the pinion gear is approximately 2.

11. A method of installing a gear set within the ram air turbine assembly comprising the steps of:
mounting a pinion gear within a gearbox of a ram air turbine assembly; and
mounting a ring gear in meshing engagement with the pinion gear within the gearbox, wherein each of the ring gear and the pinion gear include a diametrical pitch and a face width with a ratio between the diametrical pitch and the face width for both the ring gear and the pinion gear being within a range between 11.48 and 11.85 and a ratio of a length between a pitch apex and a pinion gear crown parallel to an axis of rotation of the pinion gear and a length between the pitch apex and a ring gear crown parallel to an axis of rotation of the ring gear is within a range between 1.34 and 1.60.

12. The method of installing the gear set within the ram air turbine assembly as recited in claim 11, including mounting the ring gear to a drive shaft driven by a turbine, and supporting the pinion gear on a first bearing assembly disposed forward of the pinion gear and a second bearing disposed rearward of the pinion gear, wherein the first bearing assembly is disposed at least partially within a distance between one of a pinion gear crown and a ring gear crown and a pitch apex of the gear set.

13. The method of installing the gear set within the ram air turbine assembly as recited in claim 12, including mounting the pinion gear about an axis of rotation relative to an axis of rotation of the drive shaft at an angle between 70 and 73 degrees.

14. The method of installing the gear set within the ram air turbine assembly as recited in claim 11, wherein each of the ring gear and the pinion gear comprise spiral bevel gears.

* * * * *

UNITED STATES PATENT AND TRADEMARK OFFICE
CERTIFICATE OF CORRECTION

PATENT NO.         : 9,726,149 B2
APPLICATION NO.    : 13/008203
DATED              : August 8, 2017
INVENTOR(S)        : Stephen Michael Bortoli It is certified that error appears in the above-identified patent and that said Letters Patent is hereby corrected as shown below:

In the Claims

Replace Column 4, Line 56-Column 6, Line 41, (approx.) with the following Claims:

1. A gear set for a ram air turbine, the gear set comprising:
   a ring gear supported on a drive shaft driven by a turbine;
   a pinion gear driven by the ring gear, the pinion gear driving a pinion shaft, wherein each of the ring gear and the pinion gear include a diametrical pitch and a face width with a ratio between the diametrical pitch and the face width for both the ring gear and the pinion gear being within a range between 11.48 and 11.85.

2. The gear set for the ram air turbine as recited in claim 1, wherein each of the ring gear and the pinion gear comprise spiral bevel gears.

3. The gear set for the ram air turbine as recited in claim 2, wherein a spiral angle of gear teeth on each of the ring gear and the pinion gear is related to an angle between the drive shaft and the pinion shaft according to a ratio within a range between 0.377 and 0.498.

4. The gear set for the ram air turbine as recited in claim 1, wherein a ratio of a number of teeth disposed on the ring gear and a number of teeth on the pinion gear is approximately 2.

5. The gear set for the ram air turbine as recited in claim 1, wherein a ratio of a distance between a pitch apex and pinion gear crown and a distance between the pitch apex and a ring gear crown is within a range between 1.34 and 1.60.

6. The gear set for the ram air turbine as recited in claim 1, wherein a ratio of a pitch diameter of the pinion gear and a pitch diameter of the ring gear is between 0.41 and 0.50.

Signed and Sealed this
Twenty-sixth Day of March, 2019

Andrei Iancu
*Director of the United States Patent and Trademark Office*

7. The gear set for the ram air turbine as recited in claim 1, wherein a ratio between a mounting distance from a front surface of the ring gear and a pitch apex and a mounting distance between a stop surface of the pinion gear is approximately 1.65.

8. The gear set for the ram air turbine as recited in claim 1, including a first bearing assembly for supporting rotation of the pinion gear disposed forward of the pinion gear and a second bearing supporting rotation of the pinion gear disposed rearward of the pinion gear, wherein the first bearing assembly is disposed at least partially within a distance between one of a pinion gear crown and a ring gear crown and a pitch apex of the gear set.

9. A ram air turbine assembly comprising
   a turbine driving a drive shaft;
   a gearbox supporting the drive shaft and a pinion shaft;
   a ring gear supported within the gearbox on the drive shaft; and
   a pinion gear supported within the gearbox on the pinion shaft, wherein each of the ring gear and the pinion gear include a diametrical pitch and a face width with a ratio between the diametrical pitch and the face width for both the ring gear and the pinion gear being within a range between 11.48 and 11.85.

10. The ram air turbine assembly as recited in claim 9, wherein the pinion gear and the ring gear comprise spiral bevel gears.

11. The ram air turbine assembly as recited in claim 9, wherein a ratio of a number of teeth disposed on the ring gear and a number of teeth on the pinion gear is approximately 2.

12. The ram air turbine assembly as recited in claim 9, wherein a ratio of a length between a pitch apex and a pinion gear crown parallel to an axis of rotation of the pinion gear and a length between the pitch apex and a ring gear crown parallel to the axis of rotation of the ring gear is within a range between 1.34 and 1.60.

13. A method of installing a gear set within the ram air turbine assembly comprising the steps of:
   mounting a pinion gear within a gearbox of a ram air turbine assembly; and
   mounting a ring gear in meshing engagement with the pinion gear within the gearbox, wherein each of the ring gear and the pinion gear include a diametrical pitch and a face width with a ratio between the diametrical pitch and the face width for both the ring gear and the pinion gear being within a range between 11.48 and 11.85.

14. The method of installing the gear set within the ram air turbine assembly as recited in claim 13, including mounting the ring gear to a drive shaft driven by a turbine, and supporting the pinion gear on a first bearing assembly disposed forward of the pinion gear and a second bearing disposed rearward of the pinion gear, wherein the first bearing assembly is disposed at least partially within a distance between one of a pinion gear crown and a ring gear crown and a pitch apex of the gear set.

15. The method of installing the gear set within the ram air turbine assembly as recited in claim 14, including mounting the pinion gear about an axis of rotation relative to an axis of rotation of the drive shaft at an angle between 70 and 73 degrees.

16. The method of installing the gear set within the ram air turbine assembly as recited in claim 13, wherein each of the ring gear and the pinion gear comprise spiral bevel gears.